(12) United States Patent
Pauley et al.

(10) Patent No.: US 9,491,035 B1
(45) Date of Patent: Nov. 8, 2016

(54) CLOUD SERVICES DIRECTORY PROTOCOL

(75) Inventors: Wayne Pauley, Hudson, NH (US);
Stephen Todd, Shrewsbury, MA (US);
Mich Fisher, Natick, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 287 days.

(21) Appl. No.: 13/538,370

(22) Filed: Jun. 29, 2012

(51) Int. Cl.
*G06F 15/16* (2006.01)
*H04L 29/08* (2006.01)

(52) U.S. Cl.
CPC .............................. *H04L 29/08648* (2013.01)

(58) Field of Classification Search
CPC ... H04L 67/10; H04L 67/42; H04L 67/1097; H04L 67/148; H04L 63/10; H04L 41/12; H04L 41/0803; H04L 41/50; H04L 47/70; H04L 47/78; H04L 47/821; H04L 47/1002; H04L 47/1021; H04W 4/003; H04N 1/00244; G06F 9/45533; G06F 9/50; G06F 9/5011
USPC .......... 709/201–204, 223–226; 718/100, 104
See application file for complete search history.

(56) References Cited

U.S. PATENT DOCUMENTS

| | | | |
|---|---|---|---|
| 8,261,295 B1 * | 9/2012 | Risbood et al. .............. | 719/328 |
| 8,799,455 B1 * | 8/2014 | Vora et al. .................... | 709/224 |
| 2001/0051913 A1 * | 12/2001 | Vashistha ............... | G06Q 10/06 705/37 |
| 2012/0060165 A1 * | 3/2012 | Clarke .................. | G06F 9/5038 718/104 |
| 2012/0060212 A1 * | 3/2012 | Inoue .................... | G06F 9/5038 726/14 |
| 2013/0067090 A1 * | 3/2013 | Batrouni et al. ............. | 709/226 |
| 2013/0242340 A1 * | 9/2013 | Liu et al. ..................... | 358/1.15 |
| 2013/0297770 A1 * | 11/2013 | Zhang .......................... | 709/224 |
| 2013/0304918 A1 * | 11/2013 | Kneckt ......................... | 709/225 |

OTHER PUBLICATIONS

K. Zeilenga, "Lightweight Directory Access Protocol (LDAP): Technical Specification Road Map," Network Working Group, Request for Comments: 4510, Jun. 2006, 7 pages.
P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Oscar Louie
*Assistant Examiner* — Da T Ton
(74) *Attorney, Agent, or Firm* — Ryan, Mason & Lewis, LLP

(57) ABSTRACT

Techniques for discovering and evaluating services available via a cloud infrastructure. In one example, a method comprises the following steps. A service discovery request is sent to a plurality of service providers in a cloud computing system. One or more service discovery responses are received from one or more of the plurality of service providers for one or more proposed services. A weighted appropriateness score is computed for each of the proposed services based on each service discovery response. At least one of the proposed services is automatically engaged based on the weighted appropriateness scores.

20 Claims, 4 Drawing Sheets

| | |
|---|---|
| CAPABILITY QUERY | 350-1 |
| COST QUERY | 350-2 |
| TRUST QUERY | 350-3 |
| LOCATION QUERY | 350-4 |
| SLA QUERY | 350-5 |

CLOUD SERVICES DIRECTORY PROTOCOL

FIELD

The field relates to distributed virtual infrastructure such as cloud infrastructure, and more particularly to techniques for discovering and evaluating services that are available via such a cloud infrastructure.

BACKGROUND

Many distributed computing networks today are being implemented via a distributed virtual infrastructure, also referred to as a cloud infrastructure. The term "cloud" describes a collective computing platform that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Given the prevalence of the cloud computing paradigm in distributed computing networks today along with its on-demand capabilities, service providers are adding available cloud services to such networks on a daily basis. Discovering and evaluating such services, however, has become a challenge for an enterprise.

The Lightweight Directory Access Protocol (LDAP), as defined in the Internet Engineering Task Force (IETF) Request For Comments 4510, the disclosure of which is incorporated by reference herein, is one example of a directory protocol that provides an adequate set of service discovery operations for an enterprise inside the firewall protection of the enterprise itself (i.e., within the intranet of the enterprise). However, when an enterprise wants to extend those services (or find new services) by connecting internal resources or endpoints to cloud services outside its intranet, this can be challenging. Among other challenges, the general heterogeneity of cloud services and the underlying components that are encapsulated in the service are particularly challenging for the discovery and evaluation process.

SUMMARY

Embodiments of the present invention provide information processing techniques for discovering and evaluating services that are available via a cloud infrastructure.

In one embodiment, a method comprises the following steps. A service discovery request is sent to a plurality of service providers in a cloud computing system. One or more service discovery responses are received from one or more of the plurality of service providers for one or more proposed services. A weighted appropriateness score is computed for each of the proposed services based on each service discovery response. At least one of the proposed services is automatically engaged based on the weighted appropriateness scores.

In one example, the service discovery request comprises a capability query, a cost query, a trust query, a location query, and a service level query. Each of the one or more service discovery responses comprises a capability reply, a cost reply, a trust reply, a location reply, and a service level reply that respectively correspond to the capability query, the cost query, the trust query, the location query, and the service level query. The weighted appropriateness score for each of the service discovery responses comprises a weight factor for each of the capability reply, the cost reply, the trust reply, the location reply, and the service level reply.

In a further embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, illustrative embodiments described herein provide a cloud services directory protocol that enables an enterprise to find and assess the appropriateness of proposed cloud services from 1-to-N service providers via an automated method, and that also allows the enterprise to immediately (e.g., via self-service) engage and use one or more of the proposed cloud services. Additionally, the service request finds 1-to-N matches that meet the criteria set by the user/application using five dimensions {capability, cost, trust, location, and service level}. These service request dimensions are also extensible.

These and other features and advantages of the present invention will become more readily apparent from the accompanying drawings and the following detailed description.

BRIEF DESCRIPTION OF THE DRAWINGS

FIG. 3B shows a service discovery request, in accordance with one embodiment of the invention.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "enterprise" may include, but is not limited to, any business, company, corporation, firm, or other entity formed to undertake a given task, whether for a commercial purpose or not (e.g., social or personal enterprise).

Figure 1A:
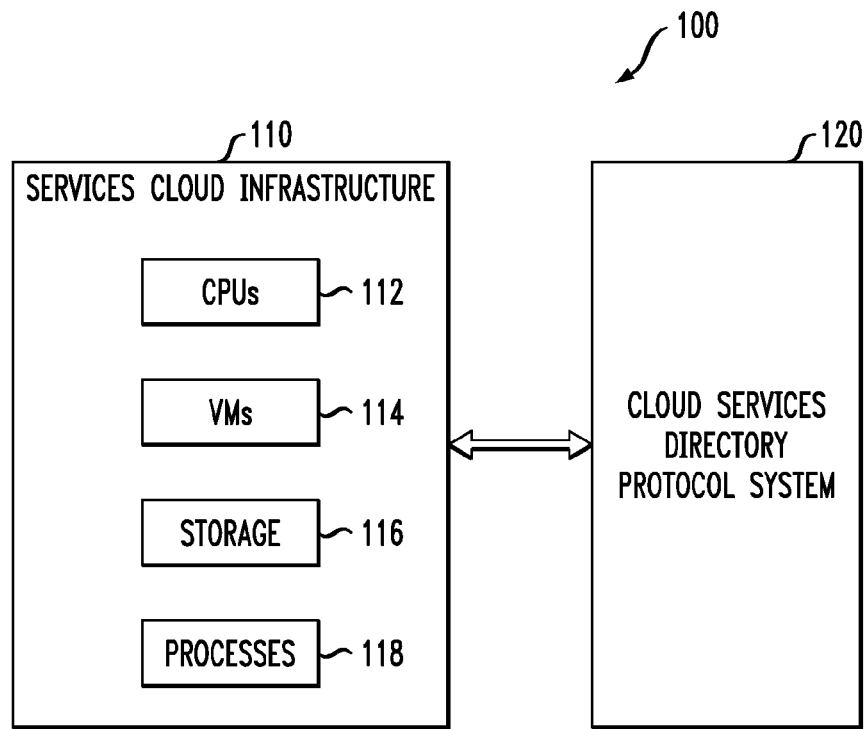
FIG. 1A shows cloud infrastructure and a cloud services directory protocol system, in accordance with one embodiment of the invention.

FIG. 1A shows a system 100 configured in accordance with an illustrative embodiment of the present invention. The system 100 comprises cloud infrastructure 110 and a cloud services directory protocol system 120. As will be explained in detail below, the cloud services directory protocol system 120 enables an enterprise to find and assess the appropriateness of proposed cloud services from 1-to-N service providers via an automated method that may also allow the enterprise to immediately (e.g., via self-service) engage and use one or more of the cloud services. Cloud infrastructure 110 is illustratively depicted in the figure as comprising an execution environment with execution components comprising one or more central processing units (CPUs) 112, one or more virtual machines (VMs) 114, and storage devices 116 (upon which logical units (LUs) are implemented) that execute one or more processes 118 that operate on one or more process input data sets that generate one or more process output data sets. It is to be appreciated that the cloud services that an enterprise will discover and evaluate are implemented in the cloud infrastructure 110 (thus, it may also be referred to as a services cloud infrastructure 110).

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the cloud services directory protocol system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
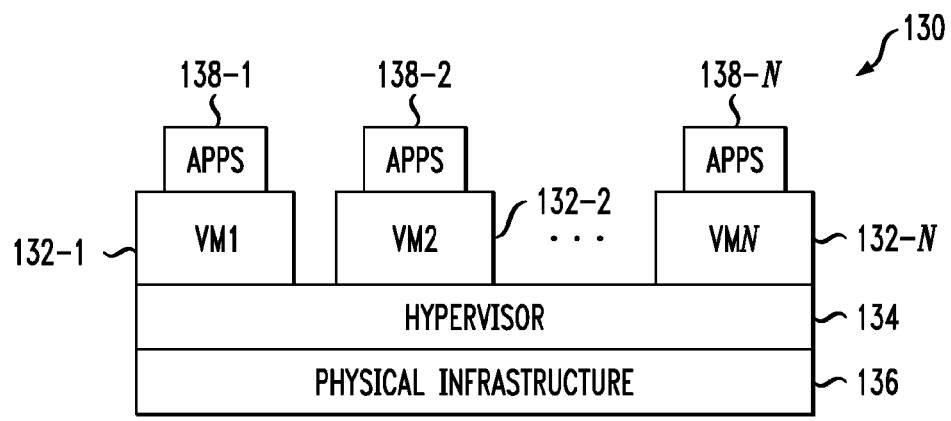
FIG. 1B shows a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUs) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer (physical infrastructure 136) dynamically and transparently. The hypervisor 134 affords the ability for multiple operating systems to run concurrently on a single physical computer and share hardware resources with each other.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
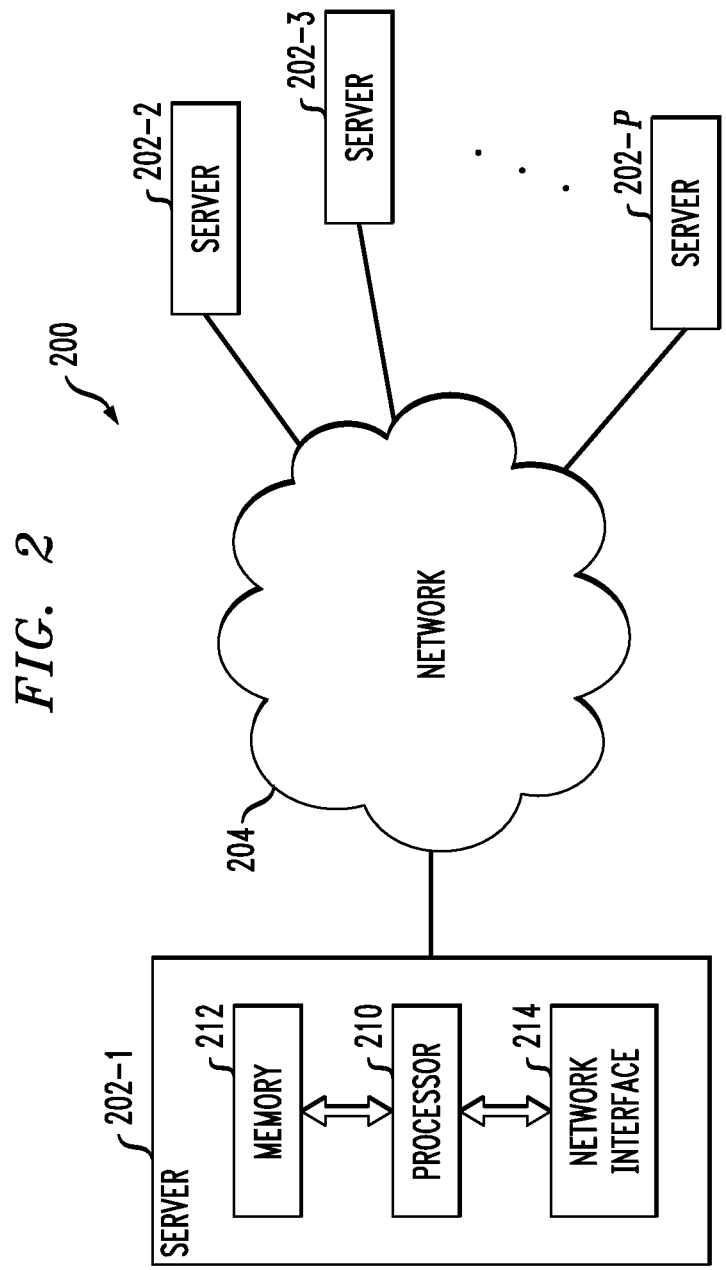
FIG. 2 shows a processing platform on which the cloud infrastructure and the cloud services directory protocol system of FIG. 1A are implemented, in accordance with one embodiment of the invention.

An example of a processing platform on which the cloud infrastructure 110 and/or the cloud services directory protocol system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, or various portions or combinations of these and other types of networks.

Illustrative details of the cloud services directory protocol system 120, as well as operations of elements of system 120, will now be described with reference to FIGS. 3A and 3B.

Embodiments of the invention realize that when needing to use a cloud service, an enterprise needs to have a way to find the service, and then to evaluate it based on some common criteria. New cloud services are being offered every day and it is advantageous when the process of finding and evaluating them is an automated process. Embodiments of the invention provide this automated process. As will be illustrated herein, once potential cloud services are identified from a plurality of providers, the potential services are evaluated against criteria for appropriateness. It is further realized that manual evaluation does not scale and does not leverage the core tenet of self-service/on-demand capability that embodies a cloud computing system. Also, since a cloud computing system is designed to make an enterprise more agile by providing (nearly) immediate useable services, it is realized that automated service discovery and evaluation methodologies and mechanisms, such as those provided by embodiments of the invention, are extremely beneficial to an enterprise.

Accordingly, embodiments of the invention provide a methodology whereby a service discovery request is sent to a plurality of service providers in a cloud computing system. One or more service discovery responses are received from one or more of the plurality of service providers offering one or more proposed services. A weighted appropriateness score is computed for each of the proposed services based on each service discovery response. At least one of the proposed services may then be automatically engaged based on the weighted appropriateness scores.

The service discovery request includes a capability query, a cost query, a trust query, a location query, and a service level query. The queries that make up the service discovery request come from, in this embodiment, five criteria (dimensions) that are useful to an enterprise in making a decision to engage a cloud service, i.e., capability of the proposed service, cost of the proposed service, a trust factor associated with the proposed service, a location of the proposed service, and a service level associated with the proposed service.

Cost of the service refers to how much the service provider charges for the service. Thus, the cost query requests that the service provider specify the cost from the perspective of where it falls within predetermined cost scores or cost score ranges.

Location of the service refers to where the service is provided, e.g., in the context of the United States, off-shore, on-shore, in what state, etc. Thus, the location query requests that the service provider specify the location from the perspective of where it falls within predetermined location scores or location score ranges.

Trust is based on visibility and control of the service. In this case, the trust query looks for a trust score such as, for example, high, medium, low, or tier 1 through tier 5. For example, tier 1 can refer to a dedicated hardware non-multi-tenant environment, while tier 5 can refer to full shared resources and only standard hypervisor, virtual machine, and guest operating system hardening techniques. Tiers 2-4 would be variants in between. Thus, the trust query requests that the service provider specify the trust dimension from the perspective of where it falls within predetermined trust scores or trust score ranges.

Capability of the service refers to the specific functionality of the service, which can be as simple as Compute as a Service (CaaS) to more specialized offerings such as High Performance Computing (HPC) or Analytics Engine or Visualization Workbenches, etc. Thus, the capability query requests that the service provider specify the capability dimension from the perspective of where it falls within predetermined capability scores or capability score ranges.

Service level is typically tied to qualifiers of service such as availability (e.g., 99.999%, 99.95%, etc.), latency, performance, recovery time objective (RTO), recovery point objective (RPO), etc. Thus, the service level agreement (SLA) query requests that the service provider specify the SLA dimension from the perspective of where it falls within predetermined service level scores or service level score ranges.

In turn, each of the one or more service discovery responses provided by the service providers includes a capability reply, a cost reply, a trust reply, a location reply, and a service level reply. These replies that make up the service discovery response respectively correspond to the capability query, the cost query, the trust query, the location query, and the service level query in the service discovery request. That is, each service provider includes a score (based on the predetermined scores/ranges mentioned above) for each dimension (query) in the request.

The weighted appropriateness score for each of the service discovery responses thus includes a weight factor for each of the capability reply, the cost reply, the trust reply, the location reply, and the service level reply. One or more of the proposed services are rejected based on the weighted appropriateness score failing to meet a minimum requirement level. The weighted appropriateness scores are compared and the proposed service with the highest weighted appropriateness score is selected as the proposed service to automatically engage. Of course, other comparison/selection criteria could be applied.

By way of one example, assume that the cloud services directory protocol system 120 sends out a compute service request (e.g., CaaS request) to service providers in a cloud computing system (cloud infrastructure 110). In accordance with the five dimensions described above, the compute service request may be structured as follows:

Capability=Yes, score of 5 required
    SLA=99.95, score range of 2-5 required
    Cost=<=0.10/cpu hour, score range of 2-5 required
    Trust=multi-tenant, score range of 2-5 required
    Location=on-shore, any state, score range of 3-5 required
    Accept score >=15

This means that each service provider addresses the requirements specified in the request by providing a reply for each query. Thus, assume by way of further example, that for the above compute service request, the following respective responses come back from two services providers XYZ and ABC:

Compute Service XYZ
Capability=Yes, score=5 of 5 possible
SLA=99.95, score=2 of 5
Cost=0.01/cpu hour, score=5 of 5
Trust=multi-tenant, score=2 of 5
Location=offshore, score=1 out of 5

A weighted appropriateness score for this proposed service would thus be computed as 15 of 25 (by adding up the weight specified for each dimension, i.e., 5+2+5+2+1=15).

Turning now to the response from provider ABC, we have:

Compute Service ABC
Capability=Yes, score=5 of 5 possible
SLA=99.95, score=2 of 5
Cost=0.10/cpu hour, score=1 of 5
Trust=multi-tenant with trust chip, score=4 of 5
Location=same U.S. state, score=5 out of 5

A weighted appropriateness score for this proposed service would thus be computed as 17 of 25 (by adding up the weight specified for each dimension, i.e., 5+2+1+4+5=17).

Thus, provider ABC has a higher weighted appropriateness score, and as such, the compute service offered by provider ABC is selected over that of provider XYZ. The enterprise can then automatically engage and start using the selected service. Note that since the request specified that the accept score had to be equal to or greater than 15, responses for services with weighted appropriateness scores less than 15 would be rejected.

It is to be appreciated that the predetermined scores/ranges (and what each score/range corresponds to) are sent to the provider so that they can determine if they have an offering that satisfies the required score/range. Service providers thus have to know the scoring scheme and publish those scores/ranges for their services. So it is to be understood that the scoring method is agreed upon before a service provider can participate in the directory.

It is also to be appreciated that one or more of the service providers that provide responses could be providers within the enterprise itself (i.e., inside the intranet of the enterprise), while the remainder of the responding service providers are external to the enterprise. It might be that a proposed service of an internal provider will result in a higher weighted appropriateness score than any external provider based on the likely high scores associated with the location, SLA, and trust dimensions for the internal provider.

It is also to be appreciated that embodiments of the invention may be applied to extend the Web Services Description Language (WSDL) to include a weighted scoring mechanism such as is described herein. As is known, WSDL is an Extensible Markup Language (XML) based language that is used for describing the functionality offered by a Web service. A WSDL description of a web service (also referred to as a WSDL file) provides a machine-readable description of how the service can be called, what parameters the service expects, and what data structures the service returns.

Figure 3A:
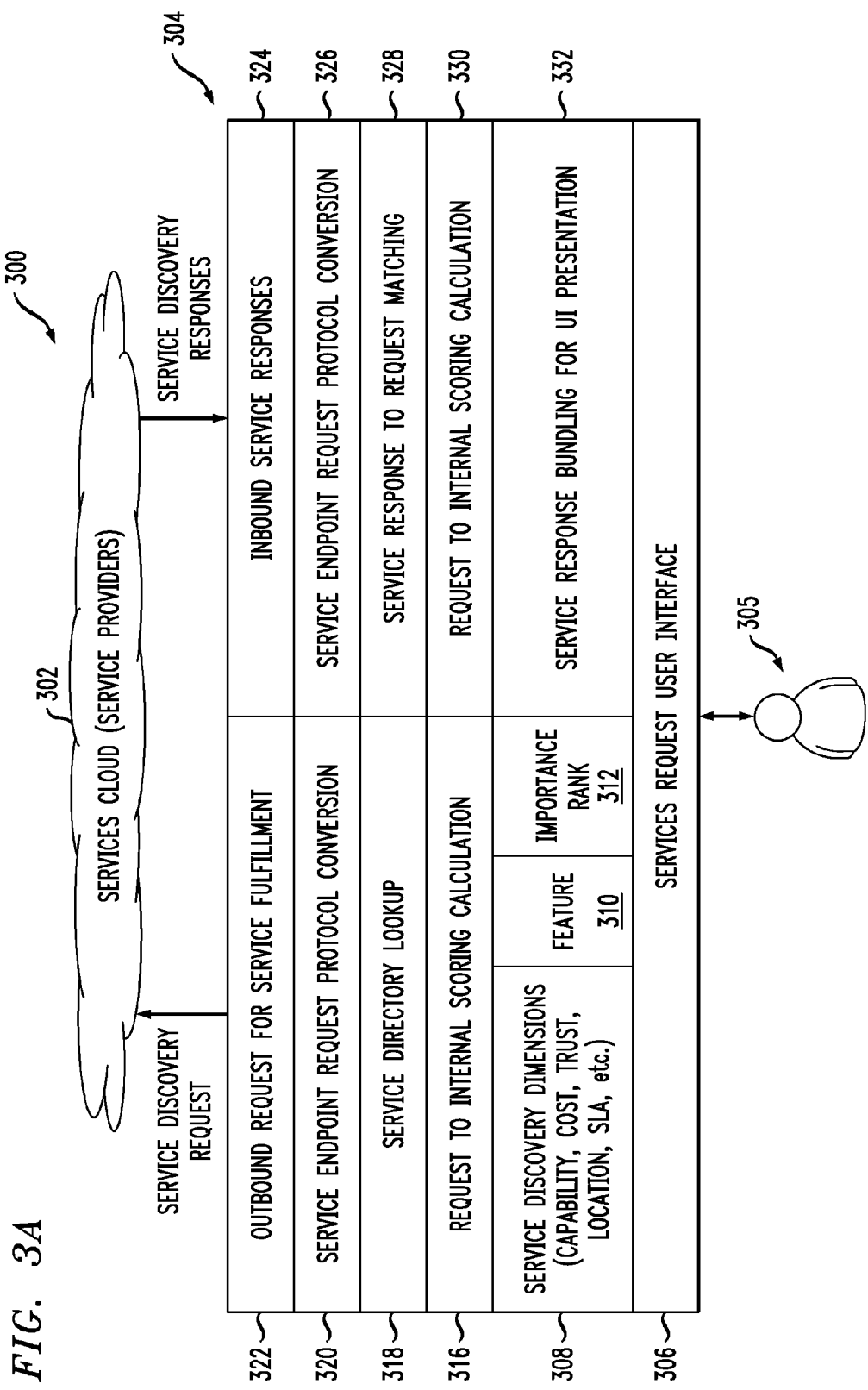
FIG. 3A shows a cloud services directory protocol system environment, in accordance with one embodiment of the invention.

Turning now to FIG. 3A, a cloud services directory protocol system environment 300 is shown, in accordance with one embodiment of the invention. System environment 300 is configured to provide the automated discovery and evaluation mechanisms described above.

As shown, environment 300 includes a services cloud 302 and a cloud services directory protocol system 304. Services cloud 302 corresponds to cloud infrastructure 110 in FIG. 1A, while cloud services directory protocol system 304 corresponds to system 120 in FIG. 1A. Entity 305 represents an individual (e.g., system administrator, technologist, information technology specialist, engineer, etc.) associated with an enterprise who, inter alia, provides input to system 304 so that the cloud services search and evaluation processes can be performed.

More particularly, cloud services directory protocol system 304 includes a services request user interface (UI) 306, a service discovery dimension component 308, a feature component 310, an importance rank component 312, a request to internal scoring calculation module 316, a service directory lookup module 318, a service endpoint request protocol conversion module 320, an outbound request for service fulfillment module 322, an inbound service responses module 324, a service endpoint request protocol conversion module 326, a service response to request matching module 328, a request to internal scoring calculation module 330, and a service response bundling for user interface (UI) presentation module 332.

The functions of the individual components/modules of system 304 will now be explained.

End user interface (UI) 306 presents options to the user 305 and bundles them into a service request. That is, UI 306 is where the user can specify the requirements for the service discovery request that is to be dispatched to services cloud 302. For instance, as depicted in FIG. 3B, the user can specify what the required scores/ranges need to be for the capability query 350-1, the cost query 350-2, the trust query 350-3, the location query 350-4, and the SLA query 350-5. The user can also specify in UI 306 what type of service for which the enterprise is looking. UI 306 is also where the user reviews the responses/results of the service providers.

Service discovery dimension component 308 represents the dimensions that are specified in the service discovery request created by the user via UI 306. In this example, the request includes five dimensions {capability, cost, trust, location, SLA}. However, it is to be understood that alternate requests can include more or less dimensions, i.e., the system is thus extensible to include other dimensions not specifically mentioned here.

Feature component 310 represents the type of service for which the enterprise is searching. That is, in the service request, the feature/function has to be declared as a requirement (e.g., feature=compute service). The user does this through UI 306.

Importance rank component 312 represents the importance of each score dimension (cost, SLA, etc.) and determines and assigns a weighted value or score/range such that the responses from the service providers to the request can be properly evaluated. That is, the user can specify here that certain attributes of a particular dimension should correspond to a particular score or range. The user also does this through UI 306.

Calculation module 316 is where the service discovery request is generated (composed) based on the input received for components 308, 310 and 312.

Services directory lookup module 318 identifies potential service providers that may be able to satisfy the requirements of the generated service discovery request. The request will then be sent out to those particular service providers. Alternatively, the request could be broadcast to a larger number of service providers.

Conversion module 320 is where the service request is bundled into a communications protocol message as part of the payload. Such protocols may include, but are not limited to, the Cloud IDM (identity management) from Unbound or LDAP or Federated Active Directory Services, etc. Service fulfillment module 322 then sends the outbound request to the various service providers to see who responds with a service that meets the requirements defined in the service request.

Service responses module 324 is where service responses come in from various service providers. Conversion module 326 is where the service responses are converted so that the payloads (i.e., the various service provider responses) are extracted. Service response to request matching module 328 is where matching responses are assembled for evaluation and comparison.

Scoring calculation module 330 is where responses are evaluated against the scoring system and a "best" fit or multiple best fit services are accepted (based on weighted appropriateness scores as described above). UI presentation module 332 is where service responses are packaged for viewing by the user 305 via the UI 306.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
sending a cloud service discovery request to a plurality of cloud service providers in a cloud computing system, wherein the plurality of cloud service providers comprises one or more cloud service providers operating external to a network from which the cloud service discovery request is sent and one or more cloud service providers operating internal to the network from which the cloud service discovery request is sent, wherein the cloud service discovery request comprises one or more cloud service-provider selectable criteria scoring ranges for one or more proposed cloud services, wherein scores in each of the criteria scoring ranges that are selectable by a cloud service provider are predetermined by a sender of the service discovery request, and wherein the cloud service discovery request comprises a capability query, a cost query, a trust query, a location query, and a service level query;
receiving one or more cloud service discovery responses from one or more of the plurality of cloud service providers for the one or more proposed cloud services, wherein each of the one or more cloud service discovery responses comprises scores selected by the given cloud service provider from the criteria scoring ranges predetermined by the sender of the cloud service discovery request for each of the one or more proposed cloud services, and wherein each of the one or more cloud service discovery responses comprises a capability reply, a cost reply, a trust reply, a location reply, and a service level reply that respectively correspond to the capability query, the cost query, the trust query, the location query, and the service level query;
computing a weighted appropriateness score for each of the proposed cloud services based on the cloud service-provider selected scores in each cloud service discovery response; and
automatically engaging at least one of the proposed cloud services based on the weighted appropriateness scores;
wherein the above steps are performed by at least one processing device comprising a processor coupled to a memory.

2. The method of claim 1, wherein the weighted appropriateness score for each of the service discovery responses comprises a weight factor for each of the capability reply, the cost reply, the trust reply, the location reply, and the service level reply.

3. The method of claim 1, further comprising the step of rejecting one or more of the proposed services based on the weighted appropriateness score failing to meet a minimum requirement level.

4. The method of claim 1, further comprising the step of comparing the weighted appropriateness scores and selecting the proposed service with the highest weighted appropriateness score as the proposed service to automatically engage.

5. The method of claim 1, wherein the service discovery request is sent by an enterprise and the plurality of service providers comprises at least one service provider internal to the enterprise.

6. A computer program product comprising a non-transitory processor-readable storage medium having encoded therein executable code of one or more software programs, wherein the one or more software programs when executed by a processor of a processing device causes the processing device to:
send a cloud service discovery request to a plurality of cloud service providers in a cloud computing system, wherein the plurality of cloud service providers comprises one or more cloud service providers operating external to a network from which the cloud service discovery request is sent and one or more cloud service providers operating internal to the network from which the cloud service discovery request is sent, wherein the cloud service discovery request comprises one or more cloud service-provider selectable criteria scoring ranges for one or more proposed cloud services, and wherein scores in each of the criteria scoring ranges that are selectable by a cloud service provider are predetermined by a sender of the service discovery request, and wherein the cloud service discovery request comprise a capability query, a cost query, a trust query, a location query, and a service level query;
receive one or more cloud service discovery responses from one or more of the plurality of cloud service providers for the one or more proposed cloud services, wherein each of the one or more service discovery responses comprises scores selected by the given cloud service provider from the criteria scoring ranges predetermined by the sender of the cloud service discovery request for each of the one or more proposed cloud services, and wherein each of the one or more cloud service discovery responses comprises a capability reply, a cost reply, a trust reply, a location reply, and a service level reply that respectively correspond to the capability query, the cost query, the trust query, the location query, and the service level query;

compute a weighted appropriateness score for each of the proposed cloud services based on the cloud service-provider selected scores in each cloud service discovery response; and automatically engage at least one of the proposed cloud services based on the weighted appropriateness scores.

7. An apparatus comprising:

a memory; and a processor operatively coupled to the memory and configured to:

send a cloud service discovery request to a plurality of cloud service providers in a cloud computing system, wherein the plurality of cloud service providers comprises one or more cloud service providers operating external to a network from which the cloud service discovery request is sent and one or more cloud service providers operating internal to the network from which the cloud service discovery request is sent, wherein the cloud service discovery request comprises one or more cloud service-provider selectable criteria scoring ranges for one or more proposed cloud services, wherein scores in each of the criteria scoring ranges that are selectable by a cloud service provider are predetermined by a sender of the service discovery request, and wherein the cloud service discovery request comprise a capability query, a cost query, a trust query, a location query, and a service level query; receive one or more cloud service discovery responses from one or more of the plurality of cloud service providers for the one or more proposed cloud services, wherein each of the one or more service discovery responses comprises scores selected by the given cloud service provider from the criteria scoring ranges predetermined by the sender of the cloud service discovery request for each of the one or more proposed cloud services, and wherein each of the one or more cloud service discovery responses comprises a capability reply, a cost reply, a trust reply, a location reply, and a service level reply that respectively correspond to the capability query, the cost query, the trust query, the location query, and the service level query; compute a weighted appropriateness score for each of the proposed cloud services based on the cloud service-provider selected scores in each cloud service discovery response; and automatically engage at least one of the proposed cloud services based on the weighted appropriateness scores.

8. The apparatus of claim 7, wherein the weighted appropriateness score for each of the service discovery responses comprises a weight factor for each of the capability reply, the cost reply, the trust reply, the location reply, and the service level reply.

9. The apparatus of claim 7, wherein the processor is further configured to reject one or more of the proposed services based on the weighted appropriateness score failing to meet a minimum requirement level.

10. The apparatus of claim 7, wherein the processor is further configured to compare the weighted appropriateness scores and select the proposed service with the highest weighted appropriateness score as the proposed service to automatically engage.

11. The apparatus of claim 7, wherein the service discovery request is sent by an enterprise and the plurality of service providers comprises at least one service provider internal to the enterprise.

12. The computer program product of claim 6, wherein the weighted appropriateness score for each of the service discovery responses comprises a weight factor for each of the capability reply, the cost reply, the trust reply, the location reply, and the service level reply.

13. The computer program product of claim 6, wherein the one or more software programs when executed by the processor of the processing device causes the processing device to reject one or more of the proposed services based on the weighted appropriateness score failing to meet a minimum requirement level.

14. The computer program product of claim 6, wherein the one or more software programs when executed by a processor of a processing device causes the processing device to compare the weighted appropriateness scores and select the proposed service with the highest weighted appropriateness score as the proposed service to automatically engage.

15. The apparatus of claim 7, wherein the processor is further configured to receive user input specifying which types of queries are to be contained in the cloud service discovery request such that the cloud service request has more of less than a capability query, a cost query, a trust query, a location query, and a service level query.

16. The apparatus of claim 7, wherein the capability query requests that each cloud service provider specify a capability dimension from the perspective of where the proposed service provided by the cloud service provider falls within the predetermined capability score range.

17. The apparatus of claim 7, wherein the cost query requests that each cloud service provider specify a cost dimension from the perspective of where the proposed service provided by the cloud service provider falls within the predetermined cost score range.

18. The apparatus of claim 7, wherein the location query requests that each cloud service provider specify a location dimension from the perspective of where the proposed service provided by the cloud service provider falls within the predetermined location score range.

19. The apparatus of claim 7, wherein the trust query requests that each cloud service provider specify a trust dimension from the perspective of where the proposed service provided by the cloud service provider falls within the predetermined trust score range.

20. The apparatus of claim 7, wherein the service level query requests that each cloud service provider specify a service level dimension from the perspective of where the proposed service provided by the cloud service provider falls within the predetermined service level score range.

* * * * *